United States Patent
Hogan et al.

(10) Patent No.: US 6,956,799 B1
(45) Date of Patent: Oct. 18, 2005

(54) PHASE DISCONTINUITY COMPENSATION IN A BIT-ACCURATE OPTICAL DRIVE

(75) Inventors: Josh Hogan, Los Alto, CA (US); Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 09/615,646

(22) Filed: Jul. 13, 2000

(51) Int. Cl.⁷ ............................................. G11B 7/005
(52) U.S. Cl. ............................ 369/47.28; 369/59.12
(58) Field of Search ..................... 369/59.12, 59.22, 369/47.22, 47.31, 47.28, 53.34, 53.35, 59.2, 369/47.18

(56) References Cited

U.S. PATENT DOCUMENTS

| | | | | |
|---|---|---|---|---|
| 4,353,089 A | * | 10/1982 | Winslow et al. | 386/88 |
| 4,740,942 A | * | 4/1988 | Ogino et al. | 369/47.31 |
| 4,748,611 A | * | 5/1988 | Tsuyoshi et al. | 369/59.2 |
| 4,931,628 A | * | 6/1990 | Wada | 235/454 |
| 5,043,966 A | * | 8/1991 | Zwaans | 369/47.36 |
| 5,233,589 A | * | 8/1993 | Saito et al. | 369/47.34 |
| 5,440,532 A | * | 8/1995 | Yokogawa et al. | 369/47.18 |
| 5,682,374 A | * | 10/1997 | Horigome et al. | 369/275.3 |
| 5,835,461 A | * | 11/1998 | Kobayashi et al. | 369/47.28 |
| 5,917,794 A | * | 6/1999 | Honma | 369/59.15 |
| 6,091,682 A | * | 7/2000 | Hikima | 369/47.2 |
| 6,091,688 A | * | 7/2000 | Tanoue et al. | 369/47.35 |
| 6,198,718 B1 | * | 3/2001 | Watanabe et al. | 369/291 |
| 6,333,902 B1 | * | 12/2001 | Shim | 369/47.54 |
| 6,373,816 B1 | * | 4/2002 | Kobayashi | 369/275.4 |
| 6,577,569 B1 | * | 6/2003 | Yamamoto et al. | 369/47.18 |

* cited by examiner

Primary Examiner—Hoa T. Nguyen
Assistant Examiner—Michael V. Battaglia

(57) ABSTRACT

A bit-accurate optical drive determines an address of a data block stored on a disc (the address being determined from a wobble that is embossed in the disc), and synthesizes header information for the block. When the block is read from the disc, recovered (actual) header information is compared to the synthesized header information to determine a phase difference, if any. Recovered user data is phase-shifted by the phase difference.

26 Claims, 6 Drawing Sheets

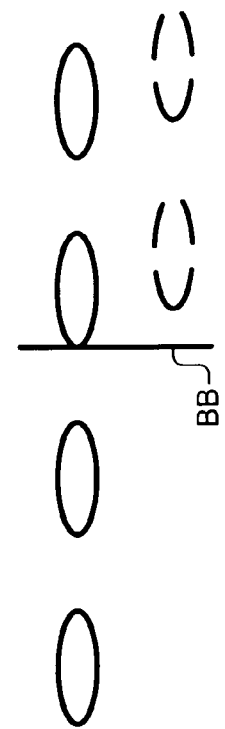
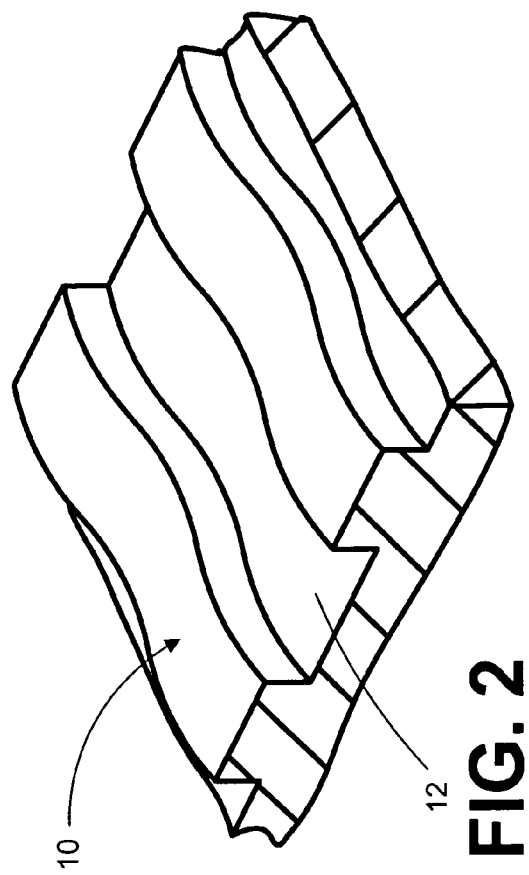
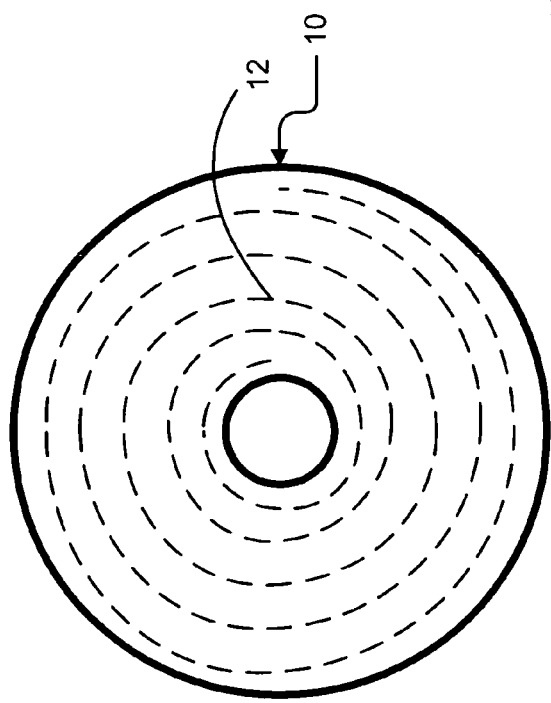

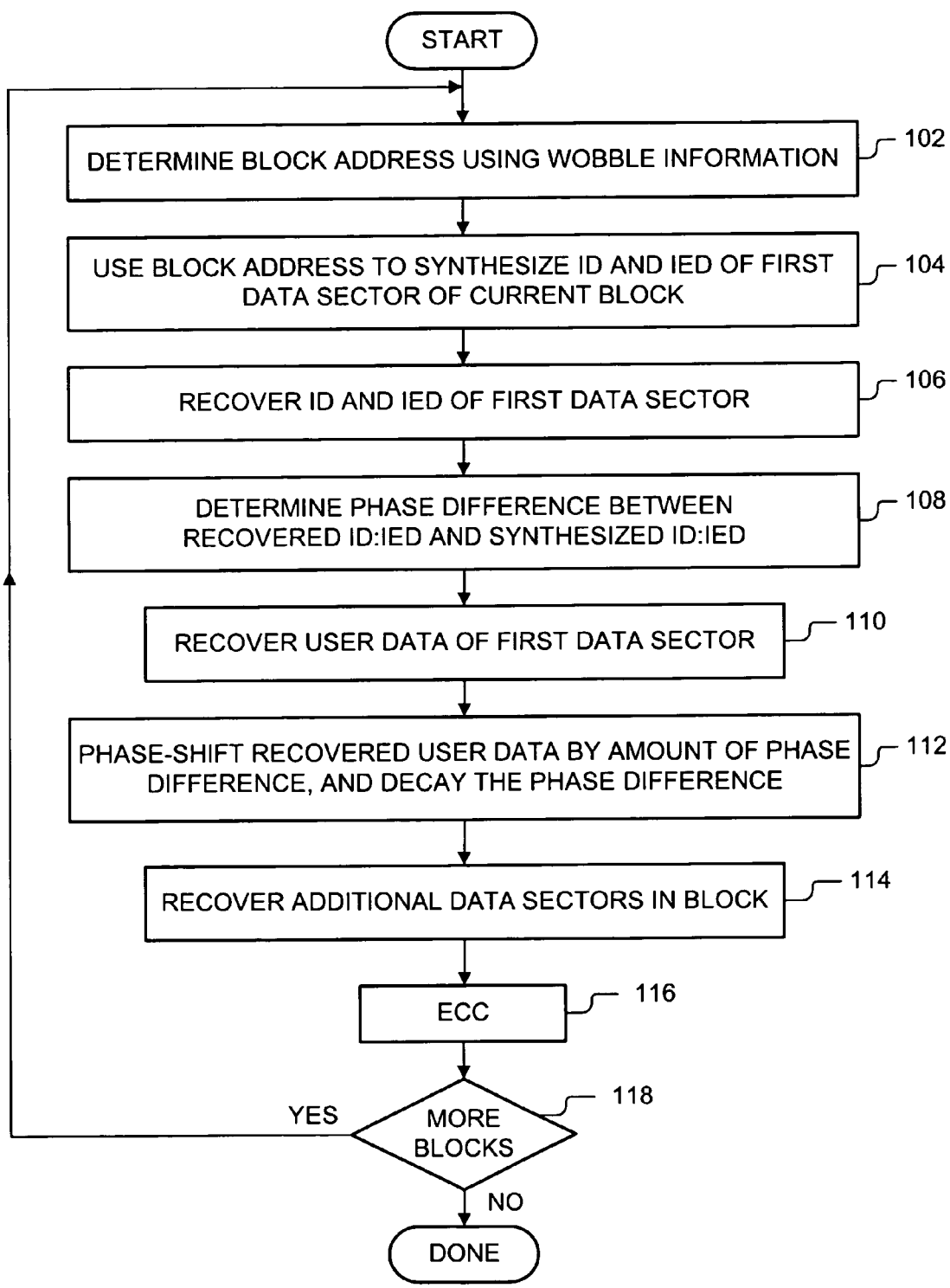

PHASE DISCONTINUITY COMPENSATION IN A BIT-ACCURATE OPTICAL DRIVE

BACKGROUND OF THE INVENTION

The invention relates to optical data storage. More specifically, the invention relates to a method for reading data from an optical storage medium such as a DVD or a CD.

"Read/write" optical discs include optical discs that allow data to be written only once and optical discs that allow data to be written many times. A DVD+RW disc is a type of read/write disc that allows data to be written many times.

When writing new data to a read/write disc, it is desirable not to create a frequency or phase discontinuity between the data being written ("new" data) and data previously written ("old" data). A read/write drive might not be able to tolerate such discontinuities during readback of the old data and the new data. During readback, the discontinuities can cause problems for read clocks and data recovery circuitry. Consequently, the discontinuities can render portions of the read/write disc effectively unreadable by the read/write drive.

The problems resulting from these discontinuities may be overcome by the use of "edit gaps" (also known as "splice areas" and "buffer zones"). Edit gaps are spaces that separate data blocks. An edit gap provides a margin of error so that old data is not overwritten by new adjacent data. However, the use of edit gaps has its drawbacks. Storage capacity of the read/write disc is reduced because data is not stored in the edit gaps.

Certain DVD read/write drives are capable of performing bit-accurate or linkless editing, whereby new blocks of data are written with negligible frequency or phase discontinuity with respect to adjacent previously written blocks of data. This bit accurate editing is accomplished by exploiting accurate timing information embossed in a high frequency wobbled groove in the read/write disc. The bit-accurate editing eliminates the need for edit gaps.

During bit-accurate editing, non-negligible phase discontinuities between old data and new data may be created due to tracking offsets while writing, asymmetric signal levels, etc. A phase discontinuity is illustrated in FIG. 3. Marks to the left of a block boundary BB represent old data, and marks (in solid) to the right of the block boundary BB represent new data. Marks in phantom reflect the correct phase of the new data.

If a phase discontinuity is encountered during readback, the read clock usually isn't able to track the new phase immediately. Instead, the read clock slews to the new phase. However, errors may occur while the read clock is slewing to the new phase. This may result in bit slipping, where the data recovery is misaligned by one or more bits. It may be a while before the read clock becomes realigned with the data having the new phase. Consequently, one or more lines of error correction capability might be lost.

The loss of error correction capability can reduce margins during readback. Error correction capability allows drive manufacturers to reduce tolerances of their drives. Any readback errors that occur as a result of lower mechanical tolerances, lower quality of optics, etc., can be corrected by performing error correction. Thus, error correction capability allows the cost of the drive to be reduced. Loosing error correction capability, on the other hand, forces the manufacturers to rely on higher tolerances. Hence, loss of error correction capability can result in higher manufacturing costs.

The loss of error correction capability can also reduce data access time. If an error occurs during readback of a data block and that error cannot be corrected, the block will be re-read. Each re-read reduces data access time.

Other formats such as CD typically overcome the phase discontinuity problems by including a preamble containing sync fields that allow the read clock to be synchronized with the new data block. For ROM compatibility reasons, the DVD+RW linkless format does not contain such sync fields.

It is therefore desirable to mitigate the disruptive effects of phase discontinuities during readback of read/write optical discs.

SUMMARY OF THE INVENTION

According to one aspect of the present invention, actual header information of a data block is recovered from an optical disc. Header information for the data block is also synthesized. User data of the block is recovered and phase-shifted by a phase difference between the synthesized and recovered header information. By navigating through the phase discontinuities, disruptive effects of the phase discontinuities during readback can be mitigated.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is an illustration of a DVD disc;

FIG. 2 is an illustration of a cross-section of the read/write disc;

FIG. 3 is an illustration of a phase discontinuity on the DVD disc;

FIG. 6 is an illustration of a method of reading a DVD+RW disc in accordance with the present invention;

DETAILED DESCRIPTION OF THE INVENTION

Figure 5:
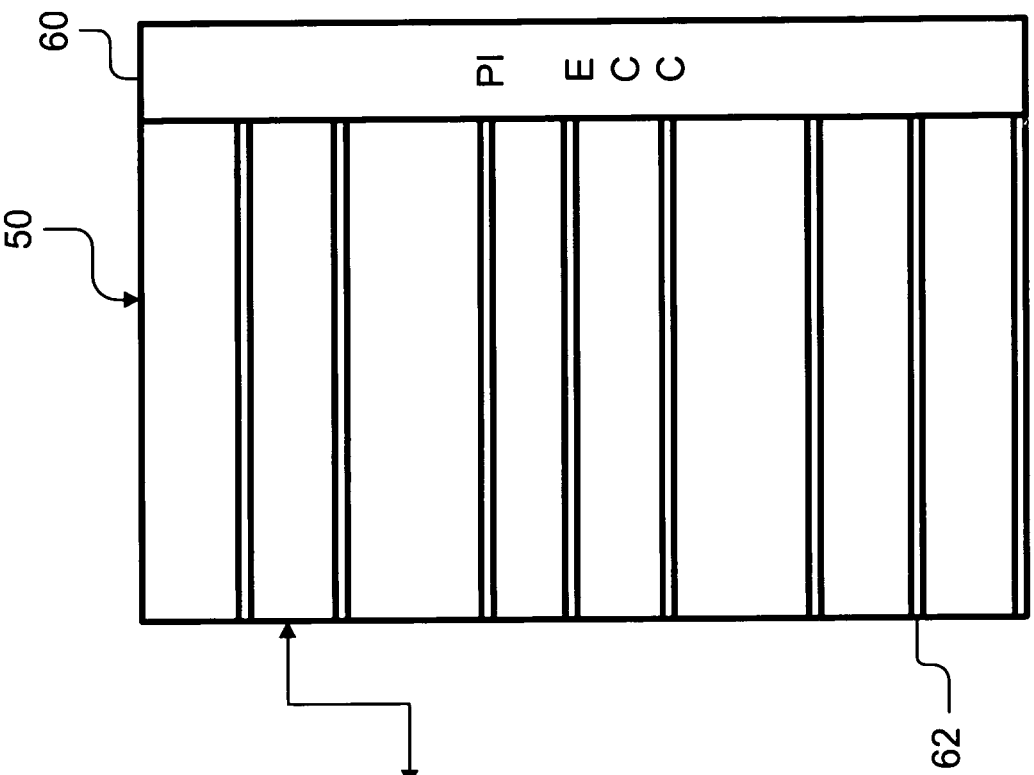
FIG. 5 is an illustration of a sector in the RS-PC block.

As shown in the drawings for purposes of illustration, the present invention is described in connection with an optical bit-accurate read/write drive that can read data from a read/write optical disc, despite phase discontinuities between adjacent blocks of old and new data. The drive phase-shifts recovered user data to navigate through the phase discontinuities. Navigating through the phase discontinuities can mitigate disruptive effects such as loss of error correction capability. Mitigating the disruptive effects can reduce manufacturing cost and reduce the number of re-reads.

In the paragraphs that follow, the read/write drive will be described as a bit-accurate DVD drive and the read/write optical disc will be described as a DVD read/write disc, which has a wobble embossed in its groove. The bit-accurate drive can determine address information from the wobble. The wobble provides sufficient timing accuracy to identify a fraction of a particular wobble cycle. The DVD drive may be a read-only drive or a read/write drive. First, a description of the DVD read/write disc will be provided, followed by a description of a data block format. After that, a method of reading the disc will be described. Then a description of the drive will be provided.

FIGS. 1 and 2 show a phase-change DVD disc 10, hereinafter referred to as the disc 10. The disc 10 typically includes a rigid substrate that is coated with a recordable medium. The recordable medium may be made of a read/write material such as a phase change material. A spiral groove 12 is embedded in the disc 10. A laser beam may be used to heat and cool the recordable medium quickly to form marks having an amorphous state. The laser beam may also be used to erase the marks from the recordable medium by annealing the marks into a crystalline state. Data is represented by patterns of marks on the disc 10.

The spiral groove 12 has a wobble. The wobble, which gives the spiral groove 12 a slight sinusoidal wave, modulates the laser beam. A bit-accurate drive, in turn, generates a precise high frequency timing signal from such a modulated laser beam. Low frequency addressing information may also be imposed on the wobble (for example, by eliminating or inverting single wobble cycles in a pattern that conveys addressing information). The combination of the high frequency timing signal and the addressing information allows the bit-accurate drive to determine addresses of data blocks being read from the disc 10.

FIGS. 1 and 2 merely provide illustrations for facilitating an understanding of the disc 10; they do not show the disc 10 in detail or proper scale. For instance, pitch of the spiral, the thickness of the groove 12, the frequency of the wobble, etc., are not illustrated to scale.

Figure 4:
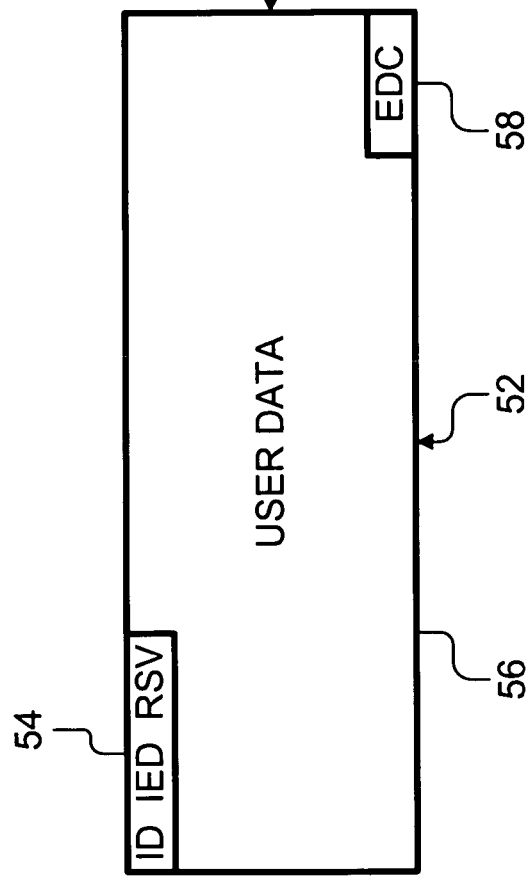
FIG. 4 is an illustration of an RS-PC block.

Reference is now made to FIGS. 4 and 5, which show a format for a typical block 50. The block 50 includes sixteen data sectors 52, each sector 52 having a length of two kilobytes (that is, "2K"). Each 2K sector includes a twelve byte header 54. The header 54, in turn includes a four byte sector address (ID), a two byte error detection code (IED) for the sector address and six bytes of reserved bits (RSV). Each sector also includes 2048 bytes (DATA) reserved for randomized user data 56, and a four byte error detection code (EDC) 58 for the randomized user data.

The 2K sectors 52 are arranged into 32K blocks of user data. ECC encoding is performed on each 32K block of user data. Reed-Solomon Product Code ("RS-PC") encoding is typically used in DVD drives. Columns 60 of RS-PC codewords (i.e., redundancy data) are appended to the user data. Rows 62 of RS-PC codewords are interleaved with the sectors. The resulting RS-PC block 50 is typically 208 lines long and 182 bytes wide.

The RS-PC block 50 is modulation encoded prior to storage on the disc 10. A typical modulation code is a 2:10 Run Length Limited code. During typical modulation encoding according to a DVD format, each byte of the RS-PC block 50 is replaced by a 16-bit symbol codeword. In addition to symbol codewords, the modulation-encoded block includes sync codewords. A sync codeword is typically inserted after every ninety one symbol codewords. Length of a typical sync codeword is four bytes.

Information is modulation-encoded as changes in polarity. Polarity refers to the high/low reflectivity characteristic of the disc 10. The polarity itself does not carry information; only the changes or transitions in polarity carry information.

When the block is written to the disc 10, lines or rows are usually laid down successively in the spiral groove 12. The lines or rows usually begin at the center of the disc 10.

FIG. 6 shows a method of reading a block of data from the disc 10. The data block currently being read will be referred to as the "current" block. The data block that was previously read will be referred to as the "previous" block. To help explain this method, it will be assumed that the previous block was read and that a read clock was properly aligned with the data in the previous block. It will also be assumed that a phase difference exists between the previous and current blocks and that the read clock cannot be aligned instantaneously with the current block when the current block is recovered. Instead, the read clock slews over a time constant to the phase of the current block.

Before the current block is read from the disc 10 (while the previous block is being recovered), the address of the current block is determined (step 102). The address may be determined from the wobble information that is embossed in the disc 10. The address is used to synthesize a first sector address (ID) and an error detection code (IED) of the current block (block 104).

Figure 7:
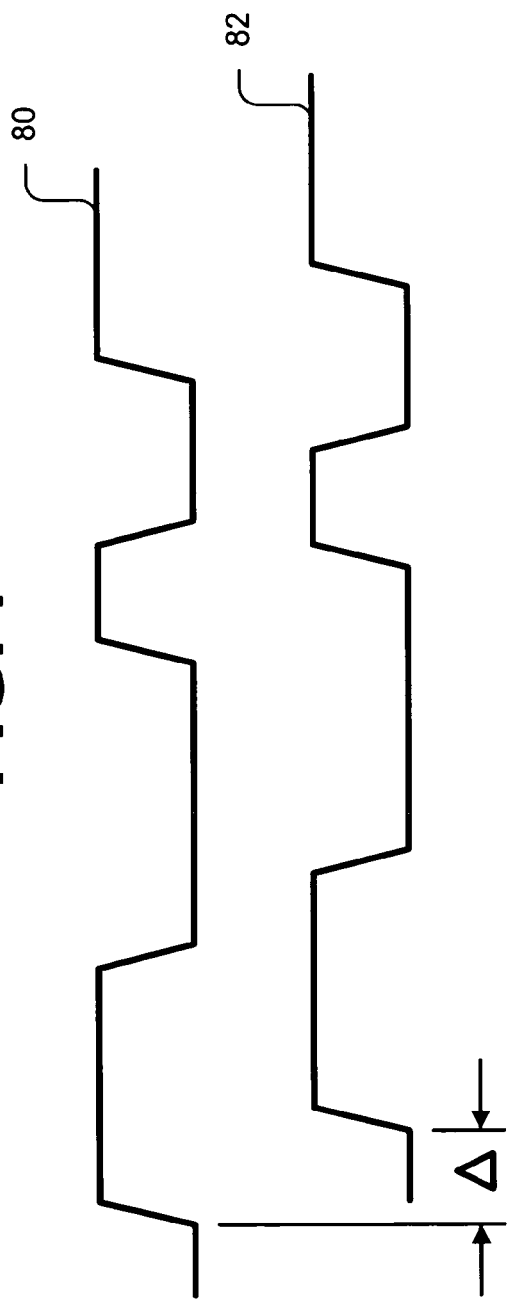
FIG. 7 is an illustration of first and second signals that are phase shifted.

When the current block is read, the data sectors are recovered from a readback signal. After the ID and IED of the first data sector are recovered (block 106), but before the user data of the first data sector is recovered (block 110), a phase difference, if any, between the recovered ID:IED of the first data sector and the synthesized ID:IED of the current block is determined (block 108). A phase difference of Δ clock cycles is illustrated in FIG. 7. A synthesized signal is denoted by reference numeral 80, and a recovered signal is denoted by reference numeral 82.

The user data of the first data sector is recovered (block 110) and the recovered user data is phase shifted by the amount of the phase difference (block 112). If, for example, a phase difference of Δ=2.71 clock cycles is detected, a combination of analog and digital techniques may be used to phase shift the user data. An analog correction may be performed by delaying the recovered user data for a period of 0.71 cycles, and a digital correction may be performed by addressing the third bit of the recovered user data as the first bit, addressing the fourth bit as the second bit, etc.

As the user data of the first data sector is being recovered, the phase difference is faded or decayed to zero. Typically, the phase difference will decay to zero during recovery of the first data sector. However, the actual rate of decay should depend upon how fast the read clock can slew to the phase of the current block. Thus, the phase difference is continually reduced, fading to zero by time the read clock has slewed to the new phase. The rate of decay should depend upon the characteristics of the read clock.

The remaining data sectors in the block are then recovered (block 114). Typically, the user data in the remaining data sectors will not be phase-shifted unless there is an edit point between sectors).

After the user data of the entire block has been recovered, demodulation and ECC correction are performed (block 116). These steps (102 to 116) may be repeated for each additional block that is read from the disc (block 118).

Determining the phase difference (step 108) becomes complicated because there is usually no unique signal pattern associated with any particular ID:IED sequence. The modulation-encoding scheme has a built-in flexibility to reduce low frequency content of the recovered signal. Therefore, a modulated IED:IED sequence may be represented in different ways.

The correct modulated sequence may be determined by deriving all possible candidates corresponding to the known ID:IED sequence and then comparing each candidate signal to the recovered ID:IED. The candidate providing the best match is selected.

If, however, the modulation-encoding format specifies exactly how the first six bytes are modulation-encoded (for instance, by a previously agreed-upon convention), then the complication is removed. The address determined from the high frequency wobble may be modulation-encoded according to the specified format.

Figure 8:
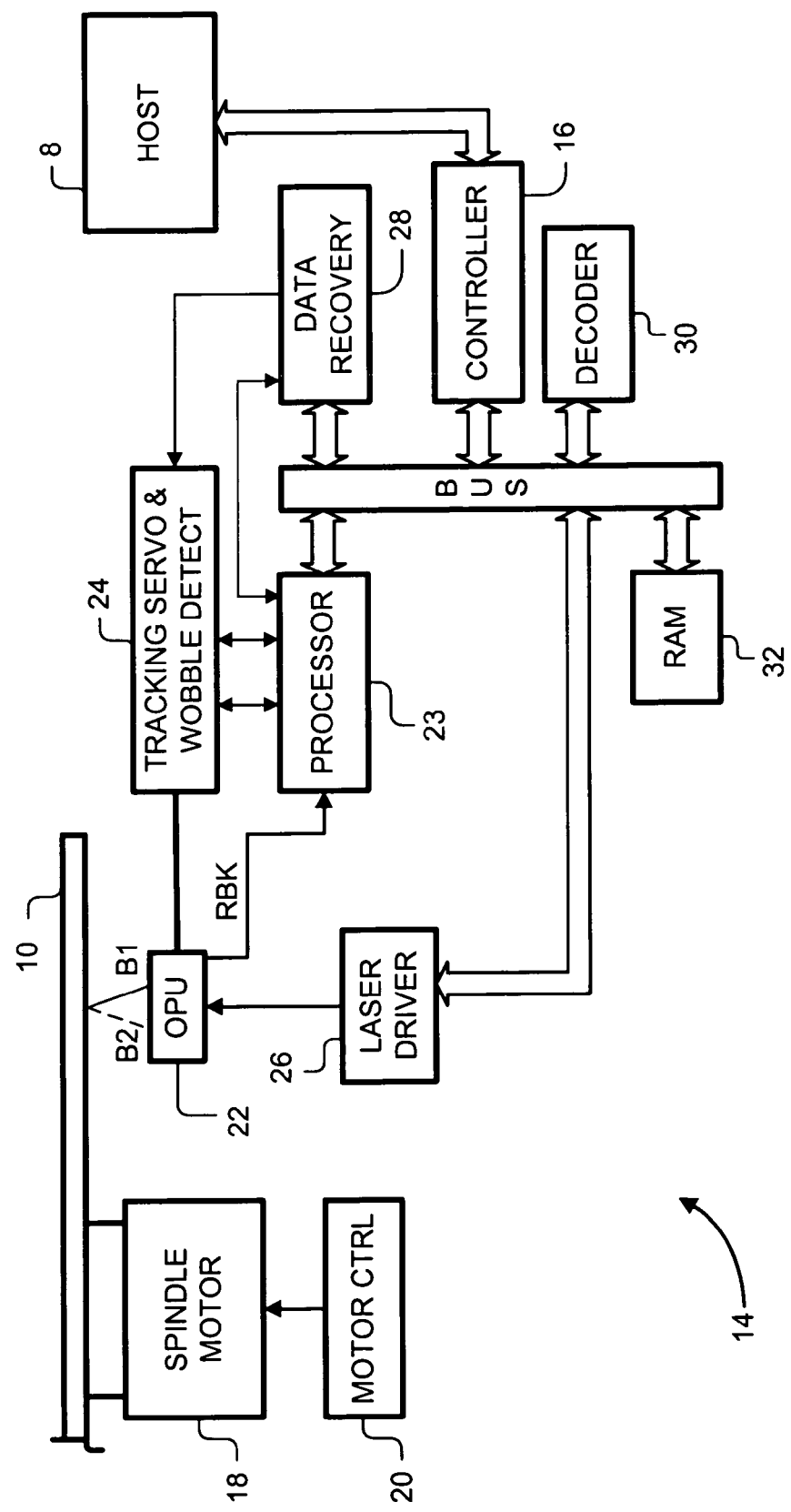
FIG. 8 is an illustration of a bit-accurate drive according to the present invention.

Reference is now made to FIG. 8, which shows a bit-accurate read/write drive 14 that can navigate through phase discontinuities encountered during read operations. The drive 14 includes a controller 16 for communicating with a host 8 (e.g., a personal computer). The drive 14 is operable in a read mode. If the drive is a read/write type, it can also be operable in various write modes such as a write-append mode and an insert-edit mode.

The drive 14 includes a spindle motor 18 and motor control 20 for rotating the disc 10. The drive 14 further includes an optical pickup unit 22, which typically includes a laser for generating a laser beam B1; and means (e.g., an optics assembly and photodetector array) for detecting a modulated beam B2. The optical pickup unit 22 generates an electrical readback signal RBK carrying data and timing/addressing information as polarity changes.

A laser driver 26 drives the laser of the optical pickup unit 22. A processor 23 receives the readback signal RBK from the optical pickup unit 22.

A tracking servo and wobble detection system 24 receives the readback signal RBK from the processor 23. The tracking servo and wobble detection system 24 processes the readback signal RBK to obtain addressing information and generate a precise high frequency timing signal. Under command of the controller 16, the tracking servo and wobble detection system 24 also moves the optical pickup unit 22 along the disc 10.

The bit-accurate drive 14 derives timing accuracy from the timing signal. The bit-accurate drive 14 also has the ability to unambiguously identify particular cycles in the timing signal. Generation of the timing signal is disclosed in assignee's U.S. Pat. No. 6,046,968, the specification of which is incorporated herein by reference.

Particular cycles of the reference signal may be unambiguously identified by, for example, a systematic arrangement of inverted or missing wobble cycles, aligned with data sectors (e.g., in sync codewords). The ability to identify particular patterns of inverted or missing wobble cycles allows data sector addresses to be located.

A data recovery circuit 28 also receives the readback signal RBK from the processor 23 and recovers data from the readback signal RBK. A decoder 30 demodulates the recovered data, arranges the demodulated data in error correction code ("ECC") blocks in RAM 32, and performs error correction on the ECC blocks. The error-corrected data is sent to the host 8. In the alternative, the demodulated data may be sent directly to the host 8, which performs the error correction.

Figure 9:
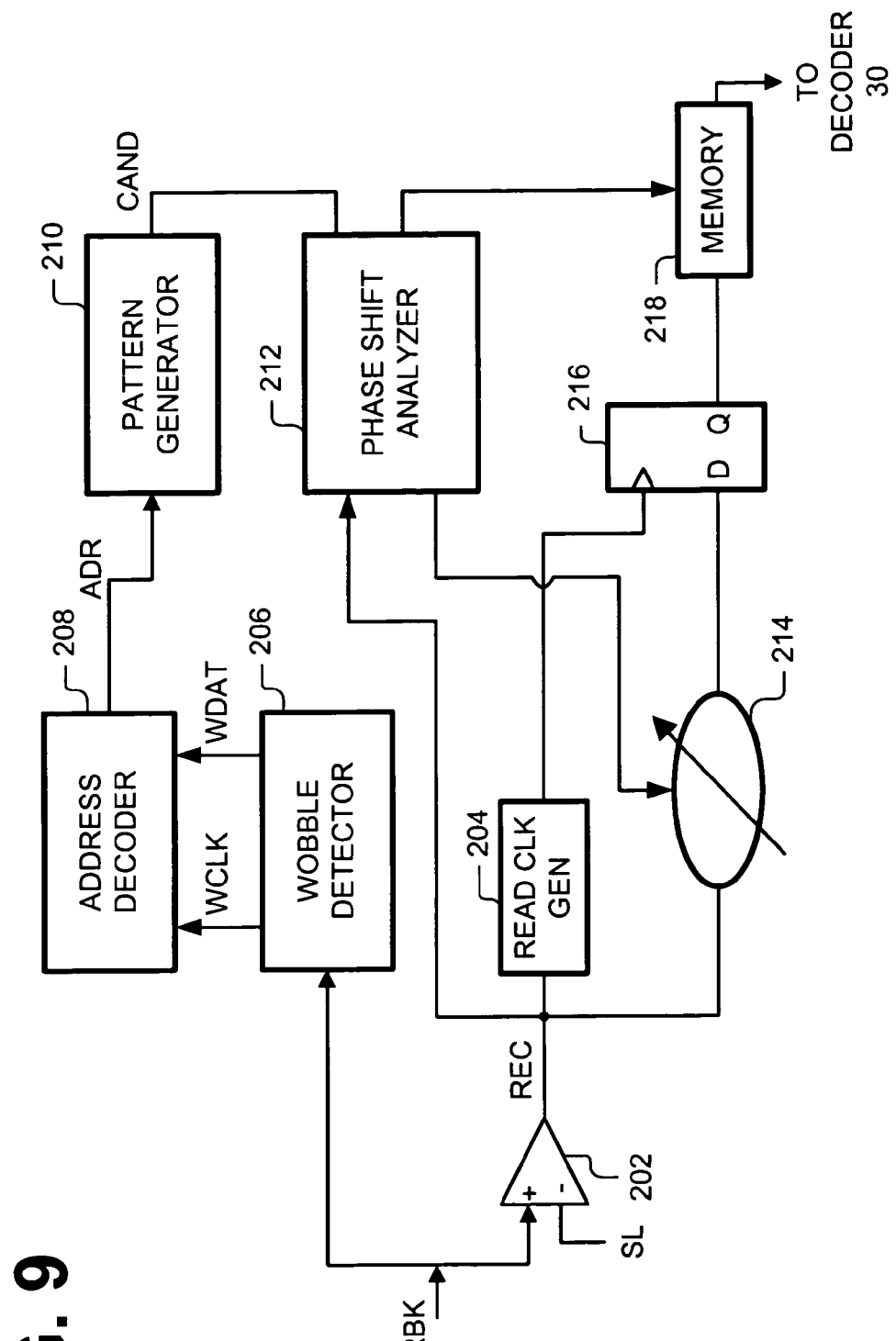
FIG. 9 is an illustration of portions of a tracking servo and wobble detection system and a data recovery circuit for the bit-accurate drive.

FIG. 9 shows portions of the tracking servo and wobble detection system 24 and portions of the data recovery circuit 28 in greater detail. The data recovery circuit 28 includes a slice generator 202 that captures slices of the readback signal RBK. An output of the slice generator 202 provides a recovered signal REC.

The recovered signal REC is supplied to a read clock generator 204. The read clock generator 204 may include a phase-locked loop for locking a clean clock to the recovered signal REC. An output of the read clock generator 204 provides a read clock CLK.

The tracking servo and wobble detection system 24 includes a wobble detector 206 and a wobble address decoder 208. The wobble detector 208 generates wobble data WDAT and a wobble clock WCLK. The wobble address decoder 208 may include a sync generator and a high frequency clock phase locked loop for decoding the wobble clock WCLK and wobble data WDAT into an address ADR.

The tracking servo and wobble detection system 24 further includes a timing and pattern generator 210. The pattern generator 210 receives an address ADR from the wobble address decoder 208, determines an error detection code for the sector address, and generates the possible candidates that could represent the ID and IED of the first data sector of the block being read.

The candidates CAND and the recovered signal REC are supplied to a phase shift analyzer 212. The phase shift analyzer 212 compares the candidates to the recovered ID:IED of the first block header, and selects the phase difference between the best candidate and the recovered ID:IED. The candidates may be compared by comparators such as conventional phase detectors, and the best candidate may be selected by a simple correlation technique (e.g., summing together analog signals representing the candidate pattern and the recovered ID:IED). The phase shift analyzer 212 may decay the phase difference over time.

The phase shift analyzer 212 supplies the fractional portion of the selected phase difference to an analog delay 214, which delays the recovered signal REC by the fractional portion of the phase difference. The variable delay 214 may include a multiplexer and different delay lines having different delay times. The multiplexer selects the delay lines and thereby selects intervals for which the slices will be delayed.

Figure 10:
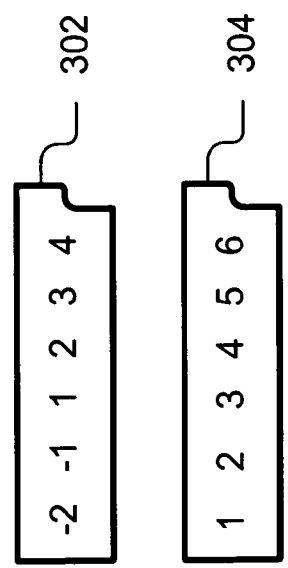
FIG. 10 is an illustration of a digitally shifted data.

A latch 216 samples the signal provided by the variable delay 214. An output of the latch is supplied to memory 218 (e.g., a shift register, a buffer), where compensation for the integer portion of the phase shift is performed. If the phase shift indicates a shift of 2.71 clock cycles, the phase shift analyzer 212 causes the stored data to be shifted by two bits. This shift may be performed by treating the third bit of data in the memory 218 as the first bit, the fourth bit as the second bit and so on (see FIG. 10, where numeral 302 denotes unshifted data and numeral 304 denotes shifted data).

Data is sent from the memory 218 to the decoder 30 for demodulation into data words (for example, the recovered data is converted from 16-bit symbols to 8-bit data words). The decoder 30 also arranges the data words in ECC blocks in RAM 32, and performs error correction on the ECC blocks.

Thus disclosed is a method and apparatus for navigating through phase discontinuities during readback of data blocks on a read/write disc. Navigating through the phase discontinuities can mitigate disruptive effects such as loss of error correction capability. Mitigating the disruptive effects can reduce manufacturing cost and the number of re-reads. The method and apparatus avoid the use of edit buffers. Thus, the phase discontinuities are corrected without reducing disc storage capacity.

If the block is generated according to a format in which each sector is written independently, then all sectors in a block may be checked for phase discontinuity. DVD-RAM is such a format.

Figure 11:
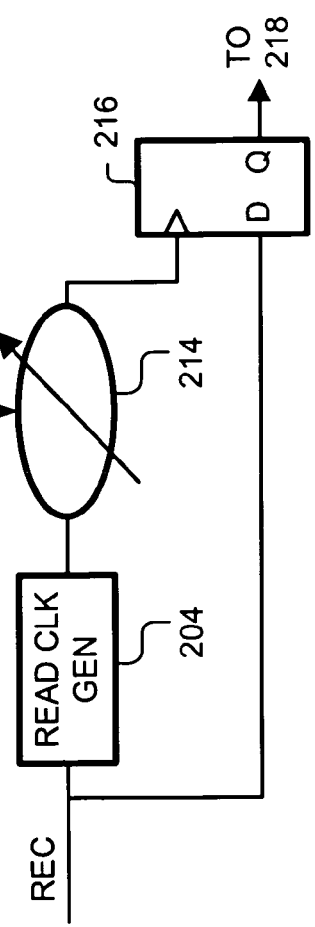
FIG. 11 is an illustration of an alternative arrangement for phase-shifting user data.

Although the user data may be phase-shifted by delaying the user data, as shown in FIG. 9, the user data may be phase-shifted in other ways. For example, the user data may be phase-shifted by variably delaying the read clock (instead of the user data), as shown in FIG. 11.

The sequences that are compared are not limited to the sector address (ID) and error detection code (IED). Instead, the sequences may include only the sector address (ID). A transition occurs on the average of every four channel code bits. Therefore, the four byte sector address (ID) would provide, on the average, about sixteen transitions in each sequence. However, sequences including both the sector address (ID) and error detection code (IED) are preferred because the average number of transitions is higher. Adding the error detection code (IED) would add, on the average, another eight transitions to each sequence. Increasing the number of transitions increases the accuracy of correlating the recovered and synthesized sequences and thereby determining the phase difference. To this end, if the six bytes of reserve bits (RSV) are set to a known value, the sequences may include the sector address (ID), error detection code (IED) and reserve bits (RSV) of the header and thereby have an even higher number of transitions.

The invention is not limited to the specific embodiment described and illustrated above. Instead, the invention is construed according to the claims that follow.

What is claimed is:

1. A method of reading a block of data stored on an optical disc, the data block including header information, the method comprising the steps of:
   synthesizing header information for the data block;
   recovering actual header information from the disc; and
   recovering actual user data from the disc, the user data being phase-shifted by a phase difference between the synthesized and recovered header information.

2. The method of claim 1, wherein the step of synthesizing the header information includes the steps of recovering address information from a wobble embossed on the disc; and synthesizing the header information from the recovered address information.

3. The method of claim 1, wherein the step of synthesizing the header information includes the steps of obtaining address information from the disc; and synthesizing the header information from the obtained address information.

4. The method of claim 3, wherein multiple candidates are synthesized from the address; wherein a phase difference between the actual header information and a best candidate is determined; and wherein the recovered user data is shifted according to the determined phase difference.

5. The method of claim 3, wherein the header information is synthesized by modulation encoding the address information according to a pre-specified format.

6. The method of claim 1, wherein the synthesized header information includes a sector address.

7. The method of claim 1, wherein the synthesized header information includes a sector address and an error detection code.

8. The method of claim 1, wherein a combination of analog and digital techniques are used to phase-shift the recovered user data.

9. The method of claim 1, wherein a read clock is used to recover the user data; and wherein the recovered user data is phase shifted by creating a phase difference between the read clock and the recovered user data.

10. The method of claim 9, wherein the recovered user data is phase shifted by time-delaying the recovered user data.

11. The method of claim 9, wherein the recovered user data is phase-shifted by time-delaying the read clock.

12. The method of claim 1, wherein the recovered user data is stored in memory prior to demodulation; and wherein the recovered user data is digitally phase-shifted by shifting the data stored in the memory.

13. The method of claim 1, wherein a phase difference is determined for only the first data sector of the block.

14. The method of claim 1, wherein a read clock is used to recover the block from the disc; and wherein the phase difference is faded to zero according to a time constant related to the read clock.

15. A bit-accurate read/write drive for reading a data block from a disc, the drive comprising:
    means for synthesizing header information for the data block;
    means for recovering actual header information from the disc; and
    means for recovering actual user data from the disc, the user data being phase-shifted by a phase difference between the synthesized and actual header information.

16. Apparatus for reading a block of data from an optical disc, the apparatus comprising:
    an optical pickup unit;
    an address detector;
    a data recovery circuit for recovering data from an output of the optical pickup unit, the recovered data including actual header information and actual user data of the data block;
    a first circuit for synthesizing header information for the data block;
    a second circuit for determining a phase difference between the recovered actual header and synthesized header information; and
    a third circuit for phase-shifting the recovered user data by the determined phase difference.

17. The apparatus of claim 16, wherein the first circuit synthesizes the header information by recovering address information from a wobble embossed on the disc; and synthesizing the header information from the recovered address information.

18. The apparatus of claim 16, wherein address information is contained on the disc; and wherein the first circuit synthesizes the header information from the address information contained on the disc.

19. The apparatus of claim 18, wherein the second circuit generates multiple candidates from the address information and determines the phase difference as the phase difference between the recovered actual header information and a best candidate.

20. The apparatus of claim 16, wherein the third circuit includes a variable delay for phase-shifting by a fractional portion of the phase difference and memory for shifting by an integer portion of the phase difference.

21. The apparatus of claim 16, wherein the data recovery circuit includes a read clock; and wherein the recovered actual data is phase-shifted by creating a phase difference between the read clock and the recovered actual user data.

22. The apparatus of claim 21, wherein the recovered data is phase shifted by time-delaying the recovered actual user data.

23. The apparatus of claim 21, wherein the recovered data is phase-shifted by time-delaying the read clock.

24. The apparatus of claim 16, wherein the data recovery circuit includes a read clock; and wherein the second circuit determines a phase difference only for the first data sector of the block and fades the phase difference to zero according to a time constant related to the read clock.

25. The apparatus of claim 16, wherein the apparatus is a DVD drive.

26. Apparatus for correcting a signal recovered during a read operation on a data block stored on a disc, the recovered signal including actual header information and actual user data of the data block, the apparatus comprising:
- a first circuit for synthesizing header information for the data block;
- a second circuit for determining a phase difference between the recovered and synthesized header information; and
- a third circuit for phase-shifting the recovered user data by the determined phase difference.

* * * * *